Patented Jan. 9, 1951

2,537,937

UNITED STATES PATENT OFFICE 2,537,937

METHOD FOR PREPARING SUBSTITUTED MELAMINES

Johnstone S. Mackay, Old Greenwich, and Joseph H. Paden, Stamford, Conn., assignors to American Cyanamid Company, New York, N. Y., a corporation of Maine No Drawing. Application May 1, 1947, Serial No. 745,246

8 Claims. (Cl. 260—249.6)

This invention relates to a process of preparing melamines from melam, melem and melon.

In certain chemical processes involving the high temperature treatment of cyanamide, dicyandiamide, ammonium thiocyanate, thiourea, and other related substances, for example, when preparing melamine by fusing dicyandiamide or ammonium thiocyanate, there is usually obtained a considerable proportion of an insoluble residue consisting principally of melam, melem and melon. These latter substances are practically worthless as such and interfere with the use of the product in many industrial applications. It is usually necessary to separate the melam, melem or melon from the desired product after which these separated substances are thrown away.

Although it has been proposed to reconvert melam to melamine, as for example by hydrolysis to melamine and ammeline, the conversions obtained thus far have been very poor, making the conversion commercially unattractive. Insofar as can be determined, no one has been able to reconvert melem or melon to melamine under any conditions and these substances, when formed, represent a complete loss. Applicants have discovered, however, that melam and also melem and melon may be converted into melamine in substantially quantitative yields by a relatively simple process which makes it possible for the first time to recover these insoluble by-products and convert them into a useful article of commerce.

As indicated hereinabove, melam, melem and melon may be converted into melamine by heating these substances in an atmosphere of ammonia at temperatures above 350° C. Similarly, they may be converted into substituted melamines by being heated in the presence of a primary or secondary amine at such temperatures. Such primary and secondary amines may be alkyl or aryl. The temperatures that are best employed are from 350° to 600° C., preferably between 400° and 500° C. At higher temperatures the conversion takes place more rapidly and, as will be shown hereinafter, very good results are obtained in periods of time as low as fifteen minutes. In fact, it appears that an excellent conversion may be obtained within a minute or two in suitable apparatus designed to permit heating such materials under high pressures and at high temperatures for short periods of time. Although it is permissible to heat melam, melem and melon for periods of time up to about five hours, there appears to be no advantage in heating for longer than two hours, and, in fact, it is preferred to employ an even shorter heating period.

Accordingly, it will be seen that when in the production of melamine, the product is so badly contaminated with deamination products of melamine, namely, melam, melem and melon, such impure product may be treated, if desired, to result in the formation of relatively pure melamine or of a substituted melamine. Obviously, when such an impure product is treated with ammonia, the melamine contained therein is, for all intents and purposes, unaffected, whereas when such a mixture is treated with one of the aforementioned amines, the melamine along with the melam, melem and melon, is converted to a substituted melamine.

It is known that melamine rapidly decomposes at temperatures above 350° C. at atmospheric pressure. In an experimental test at 400° C., 80% of the melamine decomposes during a thirty minute period to melam, melem and melon. Despite the known instability of melamine at high temperatures, it has been discovered that melam, melem and melon can be converted to melamine by heating these substances at temperatures above 350° C. with anhydrous ammonia under a pressure of at least about 1000 pounds per square inch. Surprisingly, there is no decomposition of the melamine under these conditions.

This discovery not only permits higher yields to be obtained when used in conjunction with a process for making melamine but also permits the easy production of substituted melamines when desired. There is advantage also in the fact that purification of the melamine produced by removal of melam, melem and melon may be practically avoided since these materials are converted to the desired melamine.

In order to illustrate the invention in greater detail the following examples are given.

Example 1

A quantity of melam was prepared by heating dicyandiamide to 205° C. and thereafter removing melamine, unconverted dicyandiamide, and other water-soluble substances by leaching with hot water. The insoluble product was free from yellow colored material and was therefore presumed to contain no melon. It probably contained, however, a small proportion of melem.

42 g. of the melam, prepared as just described, and 25 g. of anhydrous ammonia were placed in an autoclave and heated at 300° C. for two hours. The pressure developed in the autoclave was found to be 2,340 pounds per square inch. When the autoclave was opened and the contents examined, it was found that approximately 96% of the melam was unchanged, being present as an insoluble residue. This experiment indicates that 300° C. is too low to effect any substantial conversion of melam to melamine in two hours' time.

*Example 2*

42 g. of melam and 25 g. of anhydrous ammonia were placed in an autoclave and heated at 350° C. for two hours at a pressure of 2,340 pounds per square inch. When the autoclave was opened and the contents examined, it was found that approximately 90% of the melam had been converted to melamine.

*Example 3*

42 g. of melam and 25 g. of anhydrous ammonia were placed in an autoclave and heated at 400° C. for two hours at a pressure of 3,600 pounds per square inch. The conversion of the melam to melamine was found to be practically 100%, the insoluble residue remaining in the autoclave after extraction with hot water being negligible.

*Example 4*

42 g. of melam and 25 g. of anhydrous ammonia were placed in an autoclave and heated at 450° C. for two hours under a pressure of 2,890 pounds per square inch. The conversion of melam to melamine in this experiment was found to be approximately 98.3%.

*Example 5*

42 g. of melam and 25 g. of anhydrous ammonia were placed in an autoclave and heated at 500° C. for fifteen minutes at a pressure of 2,900 pounds per square inch. Upon opening the autoclave it was found that the melam was completely converted to melamine.

*Example 6*

42 g. of melam and 15 g. of anhydrous ammonia were heated in an autoclave at 400° C. for two hours under pressure of 1,510 pounds per square inch. The melam was converted into melamine to the extent of about 92%.

At 600 pounds per square inch the conversion was about 35%.

*Example 7*

Melon was prepared by heating 200 g. of melam to 650° C. and holding the material at this temperature for one hour. 112 g. of a yellow product was obtained which, upon chemical analysis, was found to be principally melon. This product was used in the following experiments.

42 g. of melon and 25 g. of anhydrous ammonia were heated in an autoclave to 350° C. for two hours at a pressure of 1,750 pounds per square inch. On examining the contents of the autoclave it was found that 73.8% of the melon was converted to melamine.

*Example 8*

42 g. of melon and 25 g. of anhydrous ammonia were heated in an autoclave at 400° C. for two hours under a pressure of 1,950 pounds per square inch. In this run 94.5% of the melon was converted to melamine.

*Example 9*

The preceding example was repeated at a temperature of 450° C. In this experiment 99.4% of the melon was converted to melamine.

*Example 10*

42 g. of melon and 25 g. of anhydrous ammonia were heated at 400° C. for fifteen minutes under pressure of 1,950 pounds per square inch. On opening the autoclave and examining the contents, it was found that 84.5% of the melon had been converted to melamine.

*Example 11*

63 g. of melamine and 47 g. of aniline were heated at 350° C. for one hour in a 300 cc. autoclave. Thereafter, the autoclave was cooled, vented, and its contents were removed. Separation of the constituents of the reaction mixture provided 12.0 g. of mixed N-monophenyl- and NN'-diphenylmelamine.

*Example 12*

42 g. of melam and 31 g. of aniline were heated at 400° C. for one hour in a 300 cc. autoclave. The autoclave was thereafter cooled, vented and the contents thereof removed. Separation of the constituents of this reaction mixture provided 31.1 g. of mixed N-monophenyl- and NN'-diphenylmelamine.

*Example 13*

42 g. of melamine and 37 g. of butylamine were heated at 350° C. for one hour in a 300 cc. autoclave. Thereafter the autoclave was cooled, vented to release the pressure and its contents removed. Separation of the constituents of the reaction mixture provided 23.5 g. of mixed N-monobutyl- and NN'-dibutylmelamine.

*Example 14*

42 g. of melam and 37 g. of butylamine were heated at 450° C. for one hour in a 300 cc. autoclave. Thereafter the autoclave was cooled, vented to release the pressure and its contents removed. Separation of the constituents of the reaction mixture provided 9.5 g. of mixed N-monobutyl- and NN'-dibutylmelamine.

Similarly, melem and melon may be converted to substituted melamines in accordance with the process of the invention. The NN'N''-substituted melamines may be prepared in the manner shown above, although generally a larger proportion of amine and somewhat longer periods of heating are required than were employed in the examples shown above.

The substituted melamines resulting from treatment of melam, melem and melon with the aforementioned primary and secondary amines are shown graphically by the following general formula

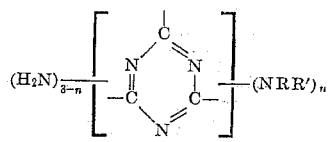

In the above formula $n$ represents an integer and is at least 1 and not more than 3, R represents an alkyl or aryl radical and R' represents hydrogen, or an alkyl or aryl radical. Illustrative examples of such radicals that R and R' may represent are: alky, e. g., methyl, ethyl, propyl, isopropyl, allyl, butyl, secondary butyl, crotyl, methallyl, ethallyl, heptyl, isoheptyl, octyl, decyl, isoamyl, octadecyl, and the like, including cycloalkyl, or alicyclic, e. g., cyclopentyl, cyclopentenyl, cyclohexyl, cyclohexenyl, cycloheptyl, and the like, and also aryl-substituted alkyl, e. g., benzyl, phenylethyl, phenylisopropyl, cinnamyl, and the like; aryl, e. g., phenyl, diphenyl, naphthyl, and the like, including alkyl substituted aryl, e. g., tolyl, xylyl, methylphenyl, ethylphenyl, propylphenyl, allylphenyl, 2-butenylphenyl, and the like; and their homologues.

While the separation of melamine from reaction mixtures in which none of the alkyl or aryl substituted melamines are present may be readily effected by simply extracting with hot water, the separation is somewhat complicated when such substituted melamines are present. Generally, the alkyl substituted melamines are selectively extracted away from melamine with an alcohol such as ethanol or n-butanol. The N-alkyl melamines, being less soluble in such alcohols, are separated from the more highly substituted alkyl melamines by fractional crystallization. The NN'- and NN'N''-alkyl substituted melamines are separated from each other on the basis of the relatively greater solubility of the hydrochlorides of the former in ethyl ether. Alternatively, such a reaction mixture may be extracted with ethyl ether to remove such NN'- and NN'N''-alkyl substituted melamines, and thereafter the residue from this extraction may be extracted with ethanol to remove such N-alkyl substituted melamines, leaving melamine as the residue. With the aryl substituted melamines, dioxane may be employed to separate such substituted melamines from the melamine. The aryl substituted melamines are recovered by removing the dioxane, and the dry mixture thereof is extracted with an alcohol such as ethanol, n-butanol and the like to remove the N-aryl substituted melamines. The residue of NN'- and NN'N''-aryl substituted melamines from the alcohol extraction is then separated by converting such melamines to the corresponding hydrochlorides, that of the NN'-aryl substituted melamines being soluble in water while that of the NN'N''-aryl substituted melamines is substantially insoluble.

Illustrative examples of primary and secondary amines that may be used in practicing the invention are: aniline, octyl amino (mono-octyl amine), methyl amine, di-methyl amine, ethyl amine, methyl ethyl amine, di-ethyl amine, propyl amine, isopropyl amine, di-propyl amine, allyl amine, di-isopropyl amine, methyl propyl amine, ethyl propyl amine, crotyl amine, butyl amine, isobutyl amine, secondary butyl amine, di-butyl amine, butyl ethyl amine, decyl amine, octadecyl amine, cyclohexyl amine, cyclopentyl amine, cyclohexenyl amine, pentyl amine, para-chloroaniline, toluidine, xylidine, N-methyl aniline, benzyl amine, allylphenyl amine, naphthyl amine, phenethyl amine, ethylphenyl amine, N-butyl toluidine, and the like.

As is apparent from the examples above given, somewhat incomplete conversions of melam, melem and melon to melamine are obtained at the low pressures of ammonia. It is preferred, therefore, that the pressure under which these materials are converted to melamine should be at least about 1,000 pounds per square inch. While there is no actual top limit on the ammonia pressure that may be employed satisfactorily, a practical upper limit of 5,000 pounds per square inch is usually imposed by the apparatus generally available. Such ammonia pressures are generally supplied to the system by the use of added ammonia. It is also advantageous when treating melam, melem or melon or mixtures thereof with amines in the manner above indicated, to employ added ammonia, and preferably in such an amount as also to provide a pressure thereof of at least 1,000 pounds per square inch. As in the conversion of these materials to melamine, such high ammonia pressures stabilize the melamines at the relatively high temperatures employed in the process.

While the invention has been described with particular reference to specific embodiments, it is to be understood that it is not to be limited thereto but is to be construed broadly and restricted solely by the scope of the appended claims.

This is the continuation-in-part of applicants' copending U. S. Serial No. 588,248, now Patent No. 2,475,709, July 12, 1949, filed April 13, 1945.

What is claimed is:

1. A method of preparing a substituted melamine of the formula

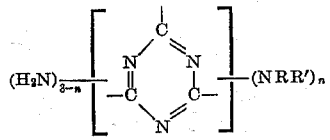

where $n$ is an integer and is at least 1 and not more than 3, R is a member of the group consisting of alkyl and aryl radicals and R' is a member of the group consisting of hydrogen, alkyl and aryl radicals, said method comprising heating at least one substance of the group consisting of melam, melem and melon with a member of the group consisting of primary and secondary, alkyl and aryl amines at a temperature of at least 350° C. in a closed reaction vessel, for a length of time not substantially in excess of two hours.

2. A method of preparing a substituted melamine of the formula

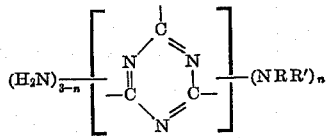

where $n$ is an integer and is at least 1 and not more than 3, R is a member of the group consisting of alkyl and aryl radicals and R' is a member of the group consisting of hydrogen, alkyl and aryl radicals, said method comprising heating at least one substance of the group consisting of melam, melem and melon with a member of the group consisting of primary and secondary, alkyl and aryl amines at a temperature within the range of 350°–600° C. in a closed reaction vessel, for a length of time not substantially in excess of two hours.

3. A method of preparing a substituted melamine of the formula

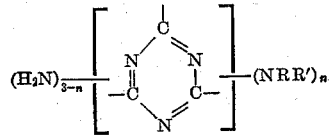

where $n$ is an integer and is at least 1 and not more than 3, R is a member of the group consisting of alkyl and aryl radicals and R' is a member of the group consisting of hydrogen, alkyl and aryl radicals, said method comprising heating at least one substance of the group consisting of melam, melem and melon with a member of the group consisting of primary and secondary, alkyl and aryl amines at a temperature within the range of 400°–500° C., for a length of time not substantially in excess of two hours.

4. The method of claim 3 in which the amine is an aryl amine.

5. The method of claim 3 in which the amine is an alkyl amine.

6. The method of claim 3 in which the amine is aniline.

7. The method of claim 3 in which the amine is n-butyl amine.

8. The method of claim 3 in which melam is employed.

JOHNSTONE S. MACKAY.
JOSEPH H. PADEN.

REFERENCES CITED

The following references are of record in the file of this patent:

UNITED STATES PATENTS

| Number | Name | Date |
|---|---|---|
| 2,222,350 | Keller | Nov. 19, 1940 |
| 2,228,161 | Zerwerck | Jan. 7, 1941 |
| 2,396,193 | Paden | Mar. 5, 1946 |

FOREIGN PATENTS

| Number | Country | Date |
|---|---|---|
| 523,448 | Great Britain | July 15, 1940 |